Feb. 24, 1970 C. W. BERGHOUT ET AL 3,496,622

METHOD OF MANUFACTURING SUPERCONDUCTIVE $Nb_3Sn$-WRAPPED WIRE

Filed Feb. 5, 1965

INVENTORS.
CORNELIS W. BERGHOUT
GIJSBERTUS M.A.J. DeKORT
ANTHONIE I. LUTEIJN
BY

AGENT 3,496,622

METHOD OF MANUFACTURING SUPERCONDUCTIVE $Nb_3Sn$-WRAPPED WIRE

Cornelis Willem Berghout, Gijsbertus Marie Arnoldus Josephus de Kort, and Anthonie Izaak Luteijn, Emmasingel, Eindhoven, Netherlands, assignors, by mesne assignments, to U.S. Philips Company, Inc., New York, N.Y., a corporation of Delaware Filed Feb. 5, 1965, Ser. No. 430,750
Claims priority, application Netherlands, Feb. 8, 1964, 6401058
Int. Cl. B21c 37/00
U.S. Cl. 29—191.6 7 Claims

ABSTRACT OF THE DISCLOSURE

A wire product for superconductors comprising a metallic sheath which contains niobium and tin powder and is drawn to a desired diameter.

Figure 1:
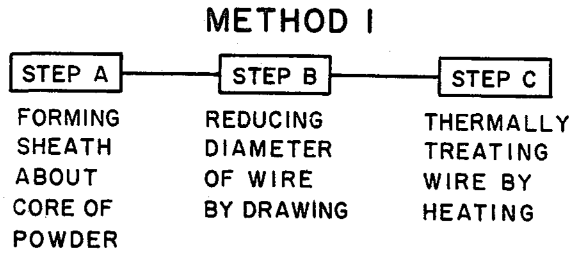
Figure 2:
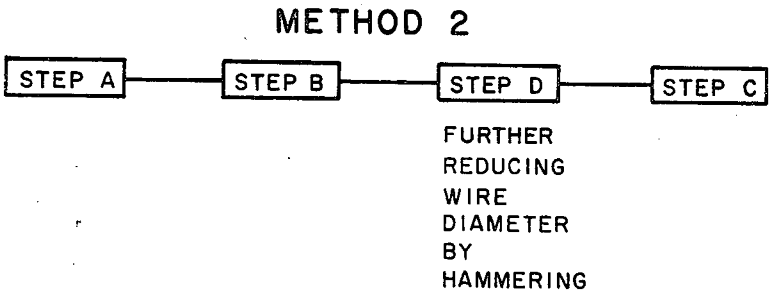
Figure 3:
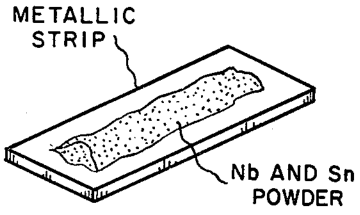
Figure 4:
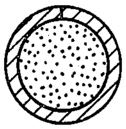

The invention relates to a method of manufacturing wire consisting of a sheath filled with a mixture of niobium and tin destined for the manufacture of wire having an $Nb_3Sn$-core, which in the superconducting condition, may be used for the transportation without losses of very high current strengths, or for the manufacture of a body wound with wire having an $Nb_3Sn$-core for producing very high magnetic fields at a temperature, at which $Nb_3Sn$ is in the superconducting condition. The invention further relates to the wire having an $Nb_3Sn$-core and to the wound body manufactured from the first mentioned wire.

The compound $Nb_3Sn$ is a known so-called "hard" superconductor, i.e. a compound which up to very high magnetic field strengths has a resistance at temperatures below 18° K. which is exactly equal to zero. Coils made from niobium-tin wire present the possibility to produce these high field strengths (up to 200 kilo oersteds) and to maintain them with a comparatively small consumption of energy. A draw back of the $Nb_3Sn$ is that it is extremely brittle, as a result of which it is not possible to manufacture coils from wound $Nb_3Sn$-wire without some ingenuity.

Such an ingenuity is embodied in the known method by which a pipe of niobium metal containing a mixture of powdered niobium and tin with a total quantity of tin of 15–30 at. percent is reduced to wire of the desired diameter, the said wire then being wound to form a coil and finally being subjected to a thermal treatment at a temperature between 920 and 1200° C. During this thermal treatment, which consequently is carried out only after the required shaping has taken place, the compound $Nb_3Sn$ is formed. The limits in temperature and duration, between which the thermal treatment must take place, are critical in connection with the structure required for obtaining optimum superconductive properties.

The niobium sheath has a double function. During drawing it performs the function of enveloping the powder mixture and during the thermal treatment it operates as a diffusion barrier, as a result of which the reaction is restricted to the core.

The niobium pipe which is used as the starting material in the known method, has a wall thickness of approximately ¼ of the outside diameter. In this case one is restricted to rather short lengths. After such a pipe is filled with the powder mixture, it is processed mechanically by hammering, shape rolling, or drawing to a wire having a diameter of from 0.1 to 1 mm. A much smaller wall thickness than ¼ of the total diameter may not be chosen since otherwise the rigidity of the wire during hammering and drawing is too low. The useful cross-section of the wire as a result is very disadvantageous.

The invention provided a method which technically is much simpler than the known method and in addition yields a wire which has a much greater useful cross-section.

In the method according to the invention the wrapped wire is manufactured by starting from a strip of the sheath material and folding this strip around the filling of the mixture of niobium and tin.

In this method rather narrow strips may be used as starting material, a wire with a very small diameter being thus obtained. Some reduction is then desired to obtain a good compression of the powder.

The so-called folding wire technique has been known for years already in the manufacture of filled welding rods or soldering rods. In this case, however, the wire is manufactured in the cold condition. During use the wire is melted entirely. This is quite different in the wire manufactured according to the invention. After a folding wire, which is manufactured also in the cold condition, has been wound to a coil, the assembly is subjected to a thermal after-treatment and is ready only then for the use as a superconducting magnetic cold. It has surprisingly been found that, in spite of the fact that the wire has a seam in the longitudinal direction, no molten phase passes through the said seam to the outside during this thermal treatment. Naturally this would have been entirely in admissible. It has been found to be of importance that the grain size in the powder mixture has not too high a value. This value must be smaller than approximately 50 microns.

The method according to the invention has another advantage. Whereas the sheath material in the known method is in fact restricted to niobium itself, in the method according to the invention also less ductile metals may be used. Notably, these metals are molybdenum, chromium, alloys of these two elements mutually, or alloys hereof with tungsten. An envelope of these metals and alloys does not react with the core and perform, in addition to the above two functions, a third function namely that of an insulator, since they are normally conductive and have a finite resistance at a temperature of 4.2° K., the boiling point of helium, in contrast with the coil which has *zero* resistance at that temperature. Niobium itself is a superconductor and as a result of this it was necessary in the known coil that the turns were insulated very carefully. In the coil according to the invention manufactured from a wire with a sheath of molybdenum, chromium alloys of these metals mutually, or alloys hereof with tungsten, the time which is required for introducing the field is comparatively low, it is true, because the sheath nevertheless has a finite resistance, but by providing a much simpler insulation in the known coil this drawback may be avoided. It even is of no importance when in this case gaps are present in the insulation. These result in a small extension of the charge time only. In the known coil the introduction of a magnetic field would be avoided by it.

The manufacture of the wire according to the invention may be carried out mechanically with the types of devices which are known for the manufacture of folding wires to be used as welding rods.

In order that the invention may be readily carried into effect it will now be described in greater detail with reference to the ensuing examples.

EXAMPLES (1) A niobium strip, 0.35 mm. thick, 8.0 mm. wide, was folded around a filling of Nb- and Sn-powder having a grain size smaller than 44 microns (in atomic ratio of 78 Nb and 22 Sn) and drawn to a wire having a diameter of 2.8 mm. by means of a die. Then the diameter of the wire was reduced to 0.9 mm. by hammering and then drawn down to a diameter of 0.65 mm. Finally the wire was fired at 970° C. for 16 hours. In a field of 40,000 oersteds this wire could pass a current of 95 a. when it was placed in a cryostat with liquid helium.

(2) A molybdenum strip, 0.3 mm. thick, 7 mm. wide, was folded around a filling of Nb- and Sn-powder having a grain size smaller than 44 microns in the atomic ratio 78:22. The diameter of this folding wire was drawn down to 3.4 mm. and then reduced to 0.8 mm. by hammering. The wire was fired at 970° C. for 16 hours. The critical current strength of the wire in the field of 40,000 oersteds was greater than 65 a.

(3) A folding wire manufactured in accordance with Example 1 was given a diameter of 1.5 mm. by hammering. In the absence of an external magnetic field a current of more than 4000 a. could be passed through the wire which was placed in a cryostat with liquid helium without the wire becoming normally conducting.

(4) Two flat rectangular coils having each 10 turns were made from 3 m. of wire which was manufactured by Example 2. Each of the coils had outside dimensions of 48 x 61 mm. and inside dimensions of 15 x 18 mm. After winding, the coils were fired at a temperature of 970° C. for 16 hours. A simple insulation was provided by dipping in an epoxy resin and then hardening thermally. When placed in a cryostat with liquid helium, a magnetic field was produced in the centre of the coil of 5000 oersteds at a current of 2000 a. After the coil had been removed from the cryostat 15 times and again placed in the cryostat and the field applied, the field of 5000 oersted was reached without being diminished. The introduction of the field may be carried out by means of the homopolar generator according to the British patent application Ser. No. 35,476/63 which has not yet been published.

What is claimed is:

1. A wire comprising a sheath having a non-welded seam along its length and filled with a mixture of niobium and tin powder having a grain size smaller than 50 microns.

2. A wire as claimed in claim 1 wherein the atomic ratio of the $Nb_3$ and Sn powder is about 78:22.

3. A method of manufacturing a superconductor wire having a $Nb_3Sn$ core comprising the steps:

(a) disposing on a metallic strip a mixture of powdered niobium and tin having a grain size smaller than 50 microns.

(b) forming the wire by folding the strip into a sheath around the core mixture, (c) reducing the diameter of the wire by drawing same and, (d) thermally treating the wire by heating the sheathed core of $Nb_3Sn$ to its alloying temperature.

4. A method as defined in claim 3 comprising the further step of hammering the wire after initially drawing same.

5. A method as defined in claim 4 wherein said sheath is selected from the group consisting of molybdenum, chromium, alloys of molybdenum and chromium, and alloys thereof with tungsten.

6. A method as defined in claim 3 wherein said powder has an atomic ratio of 78Nb and 22Sn.

7. A method as defined in claim 3 wherein thermally treating comprises heating the wire to about 970° C. for 16 hours.

References Cited

UNITED STATES PATENTS

| | | | |
|---|---|---|---|
| 3,124,455 | 3/1964 | Buekler et al. | 75—214 |
| 3,162,943 | 12/1964 | Wong | 29—552.5 |
| 3,256,118 | 6/1966 | Speidel | 148—2 |

PAUL M. COHEN, Primary Examiner

U.S. Cl. X.R.

29—194, 599